March 18, 1952 W. G. TOLAND 2,589,896
INDICATOR FOR HYDRAULIC RAMS
Filed April 15, 1949 2 SHEETS—SHEET 1
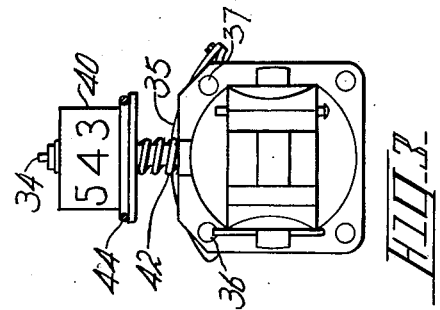
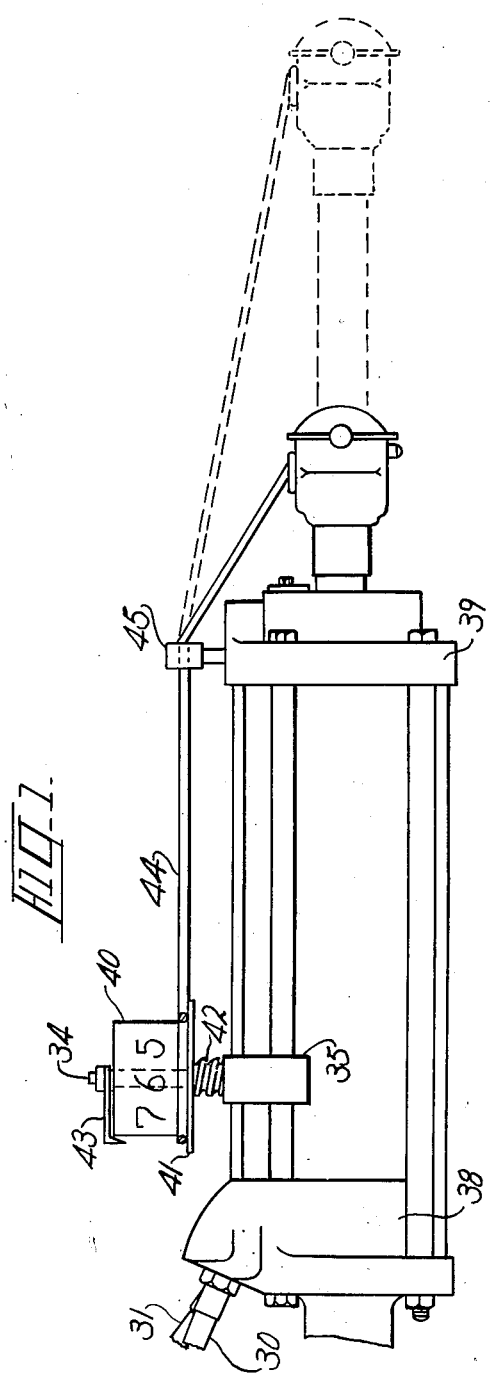
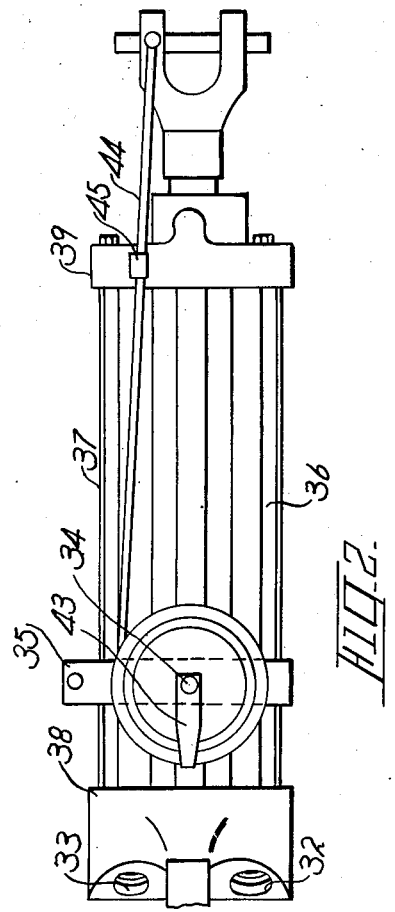
Inventor
Wayne G. Toland
Paul O. Pippel
Atty March 18, 1952 W. G. TOLAND 2,589,896
INDICATOR FOR HYDRAULIC RAMS
Filed April 15, 1949 2 SHEETS—SHEET 2
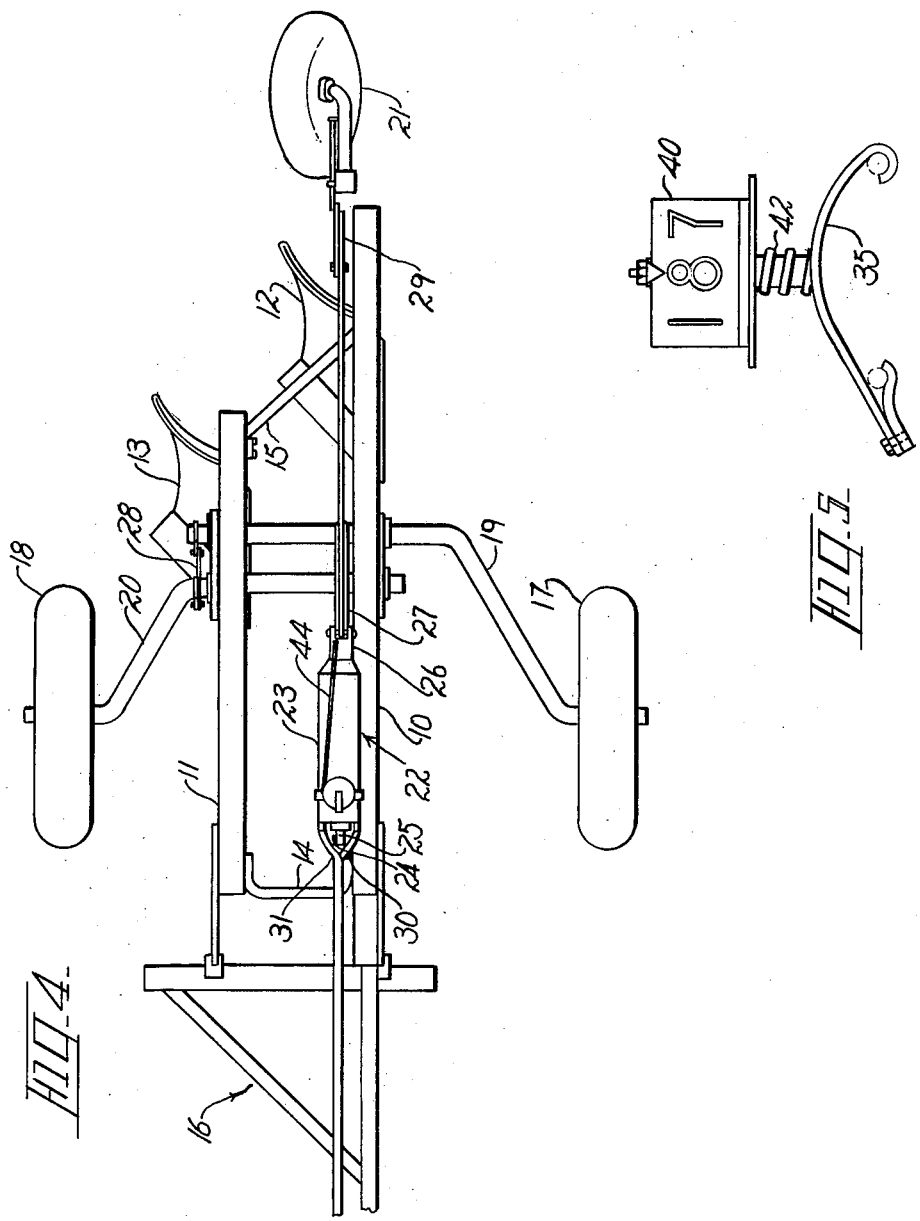
Inventor
Wayne G. Toland Patented Mar. 18, 1952

2,589,896

UNITED STATES PATENT OFFICE 2,589,896

INDICATOR FOR HYDRAULIC RAMS

Wayne G. Toland, Canton, Ill., assignor to International Harvester Company, a corporation of New Jersey Application April 15, 1949, Serial No. 87,801

3 Claims. (Cl. 116—124)

1

This invention relates to agricultural implements and particularly to power lift mechanism therefor. More specifically the invention concerns remotely controlled power lift mechanism for an implement of the trail-behind type.

In controlling the operation of a trail-behind agricultural implement such as a plow, it is known to provide a source of fluid under pressure on the tractor by which the plow is propelled over a field, and to direct the fluid through flexible hose lines to a remote ram unit mounted on the implement. The cylinder of the ram unit is anchored to the plow frame and the piston connected to the part to be operated. The movement of the piston in the cylinder to raise or lower the tools is controlled by the operator from his station on the tractor by opening and closing valves to admit to or withdraw from the cylinder the desired amount of fluid to produce a corresponding movement of the piston. The fluid is locked in the cylinder to hold the tools in the selected position.

There are a number of disadvantages inherent in this type of implement control and one of these disadvantages is that it is practically impossible for the operator from his position on the tractor to return the tool to the same operating depth after it has been lifted as at the end of a row. To overcome this difficulty it has been proposed to provide stop means on the ram unit which can be adjusted so that the tool can always be returned to the same operating depth.

However, such a stop does not take into account the fact that in very few cultivated fields is the soil uniform in texture. It is common experience in plowing, for a farmer to encounter several changes in soil density in passing from one side of a field to the other. Under such circumstances it will readily be understood that, as the plow passes through normal conditions, alternating with stretches of heavy and light soils, the operating position of the plow bottom will tend to fluctuate in accordance with the density of the soil through which it is passing. For example, if the plow wheels are set to cause the plow bottom to cut a furrow eight inches deep, the plow bottom will operate at this depth until, say, harder soil is encountered when the plow bottom will tend to rise and operate at a shallower depth. To overcome this tendency and return the plow bottom to the proper depth for uniform plowing, the operator manipulates the valve control for his ram unit to change the setting of the plow wheels to allow the plow to return to its original depth. The amount he must move the piston to

2 secure the proper depth for the plow is difficult to ascertain from his station on the tractor and the operator proceeds by trial and error. When normal soil conditions are again met the setting of the plow wheels must again be changed, which the operator does by trial and error. Now if lighter than normal soil is encountered the plow bottom will tend to dig deeper, and to overcome this the plow's gauge wheels must again be set to offset the tendency of the tool to travel at a lower depth.

The foregoing disadvantages are overcome by the present invention, which has for its object the provision of an improved remotely controlled power lift attachment for a trail-behind implement.

Another object of the invention is to provide means for effecting accurate depth control of a remote ram unit on a trail-behind implement.

A further object of the invention is to provide an indicator for a remotely controlled hydraulic ram unit, easily visible to the operator of the tractor from which the implement is controlled, whereby more uniform operating depth of the implement may be obtained.

Another object of the invention is to provide for a remotely controlled hydraulic ram unit adapted for mounting upon a trail-behind agricultural implement, an indicator actuated by movement of the piston for indicating the position of the latter relative to the cylinder.

Other objects and advantages of the invention will become clear from the following detailed description when read in conjunction with the accompanying drawings, wherein:

Fig. 1 is a view in side elevation of a hydraulic ram unit having incorporated therein the features of the present invention;

Fig. 2 is a plan view of the structure shown in Fig. 1;

Fig. 3 is an end view thereof;

Fig. 4 is a plan view of a trail-behind two-bottom moldboard plow having mounted thereupon a remotely controlled ram unit attachment embodying the features of the present invention; and Fig. 5 is an enlarged detail showing a portion of the indicating mechanism adapted to be mounted upon the cylinder of a ram unit.

Referring now to the drawings, the ram unit indicating mechanism with which this invention is concerned is illustrated in Fig. 4 as mounted upon a tractor propelled trail-behind moldboard plow. This plow is of conventional construction and comprises generally a pair of laterally spaced longitudinally extending supporting beams 10 and 11 having mounted upon the rear ends thereof plow bottoms 12 and 13. The plow beams 10 and 11 are rigidly connected by braces 14 and 15 and the plow is provided with a triangular hitch frame 16. The plow is supported upon land and furrow wheels 17 and 18 respectively carried by crank axles 19 and 20 journaled on the beams 10 and 11 so that the wheels may be moved with respect to the plow frame to raise and lower the earth working tools 12 and 13. The rear end of the plow is supported upon a furrow wheel 21.

The plow is raised and lowered to adjust the operating depth thereof and to move the earth working tools between operating and transport positions by a double-acting hydraulic ram unit 22 comprising a cylinder 23 pivotally anchored at one end by a pin 24 upon a lug 25 carried by the beam 10. A piston rod 26 is pivotally connected to a rock arm 27 mounted upon the transverse portion of crank axle 19 to raise and lower the land wheel 17, and this motion is transmitted to crank axle 20 carrying the furrow wheel 18 by conventional mechanism designated at 28. Lifting motion is likewise transmitted from the ram unit through linkage 29 to move the rear furrow wheel 21 simultaneously with movement of the land and furrow wheels 17 and 18.

Fluid under pressure is supplied to the cylinder 23 through a pair of hose lines 30 and 31 which are inserted respectively in openings 32 and 33 in one end of the cylinder as shown in Fig. 2. Fluid is supplied to the ram unit from the tractor by which the implement is propelled, the hose lines 30 and 31 being flexible to accommodate movement of the implement with respect to the tractor. The supply of the fluid to the ram unit is under control of the operator of the tractor by which the implement is drawn and the control means preferably provide for the locking of fluid in the ram unit to hold the piston in a selected position with respect to the cylinder so that the earth working tools may be held at a selected operating depth.

As pointed out before it is necessary for the operator in operating a trail-behind plow in many cases to frequently change the relative positions of the supporting wheels and the plow bottoms to assure uniform depth of plowing in soils of varying density. In order to change the depth of operation of his plow bottoms the tractor operator supplies or withdraws fluid from the cylinder 23 to extend or retract the piston 26 and thus move the wheels 17, 18, and 21. In order that the tractor operator may know the position of his tools at any point of time during the operation of the plow, an indicating mechanism is provided comprising a vertically extending shaft 34 secured at its lower end to a clamping member 35 clearly shown in Fig. 5, which is adapted to be secured to two adjacent connecting rods or bolts 36 and 37 by which the cylinder heads 38 and 39 of the cylinder 23 are retained. Rotatably mounted upon the upper portion of the shaft 34 is a cylindrical member or drum 40 provided with a flange portion 41 to which is anchored one end of a coil spring 42. Spring 42 surrounds the lower portion of the shaft 34 and its other end is suitably anchored to the clamping member 35.

The periphery of the drum 40 is calibrated and provided with circumferentially spaced numerals 1 to 8 as clearly indicated in the drawings. A pointer 43 mounted upon the upper end of the shaft 34 has a portion overlying the circular face of the drum 40 and the numeral adjacent the pointer designates for the operator the position of the piston in the cylinder and therefore the operating position of the plow bottoms.

One end of a flexible member or cord 44 is secured as indicated in Fig. 1 to the flange 41. One coil of the cord is wrapped around the lower portion of the dial 40 and extends generally parallel to the cylinder 23 to the eye of a vertically extending guide member 45 mounted upon the head 39 of the cylinder and parallel to the shaft 34. After leaving the guide 45 the cord is secured at its other end to the end of the piston 26. The length of the cord 44 and the tension on the spring 42 are adjusted so that when the piston is in retracted position as indicated in Fig. 1 the cord is wrapped around the drum 40 and the spring 42 urges the drum in a direction to wind the cord thereupon. Upon extending the piston in the cylinder to the dotted line position indicated in Fig. 1, the cord is unwound from the drum by rotation of the drum. The size of the drum is preferably chosen so that its circumference is equal to the stroke of the piston.

The indicating mechanism of the present invention should be clearly understood from the foregoing description. It should also be understood that the invention provides a solution to the problem of achieving uniform plowing depth when the plow is remotely controlled by a ram mounted on the plow from a source of power on the tractor by which the plow is propelled. The indicator of this invention has been described as extending vertically from the upper portion of the ram cylinder. However, if desired, it may be clamped to any two adjacent cylinder head bolts and may be mounted on the side to extend laterally outwardly from the cylinder. Modifications may, of course, be made in the invention without departing from the spirit thereof or the scope of the appended claims.

What is claimed is:

1. In a remotely controlled hydraulic ram power lift attachment for a trail-behind agricultural implement wherein the ram cylinder is stationary and the piston is operatively connected to the earth working tools to raise and lower the latter, indicating mechanism for designating the operating position of the tools comprising a vertically extending shaft, clamping means for securing the lower end of the shaft to the cylinder, a drum journaled on the shaft having circumferentially spaced divisions marked thereon, a pointer carried by the shaft, a cord encircling the drum and having one end anchored thereto, means for securing the other end of the cord to the piston at a location on the piston movable, upon extension thereof in the cylinder, a distance equal to the circumference of the drum, whereby movement of the piston imparts corresponding rotation to the drum, and a spring surrounding a portion of the shaft, said spring being anchored at one end to the clamping means and at its other end to the drum to bias the latter to rotation in a direction to wind the cord thereon.

2. In a remotely controlled hydraulic ram power lift attachment for a trail-behind agricultural implement wherein the ram cylinder is stationary and the piston is operatively connected to the earth working tools to raise and lower the latter, indicating mechanism for designating the operating position of the tools comprising a shaft, means for securing the shaft to the cylinder, a drum journaled on the shaft having circumferentially spaced numerals thereon, a cord encircling the drum and having one end anchored thereto, the length of the cord surrounding the drum being equal to the stroke of the piston, means for securing the other end of the cord to the piston at a location on the piston movable, upon extension thereof in the cylinder, a distance equal to the circumference of the drum, whereby movement of the piston imparts corresponding rotation to the drum, a guide member carried by the cylinder spaced from the drum adapted to receive and guide the cord from the drum to the piston, and a spring anchored to the shaft and to the drum to bias the latter in a direction to wind the cord thereon.

3. In a remotely controlled hydraulic ram power lift attachment for a trail-behind agricultural implement wherein the ram cylinder is stationary and the piston is operatively connected to the earth working tools to raise and lower the latter, indicating mechanism for designating the operating position of the tools comprising a vertically extending shaft, clamping means for securing the lower end of the shaft to the cylinder, a drum journaled on the shaft having circumferentially spaced divisions marked thereon, a pointer carried by the shaft, a cord encircling the drum and having one end anchored thereto, means for securing the other end of the cord to the piston at a location on the piston movable, upon extension of the piston in the cylinder, a distance equal to the circumference of the drum, whereby movement of the piston imparts corresponding rotation to the drum, a guide member secured to the cylinder extending vertically parallel to said shaft, said guide member having an eye adapted to receive and guide the cord between the drum and the piston, and a spring surrounding a portion of the shaft, said spring being anchored at one end to the clamping means and at its other end to the drum to bias the latter to rotation in a direction to wind the cord thereon.

WAYNE G. TOLAND.

REFERENCES CITED

The following references are of record in the file of this patent:

UNITED STATES PATENTS

| Number | Name | Date |
| --- | --- | --- |
| 1,773,589 | Lichtenberg | Aug. 19, 1930 |
| 2,154,503 | French et al. | Apr. 18, 1939 |
| 2,374,298 | Nasset | Apr. 24, 1945 |